March 26, 1946.　　F. B. HUNTER ET AL　　2,397,263
RESISTANCE WELDING APPARATUS
Filed Aug. 9, 1944　　2 Sheets-Sheet 1
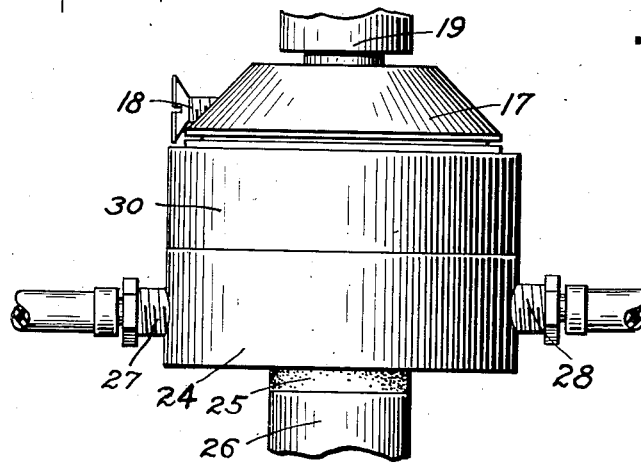
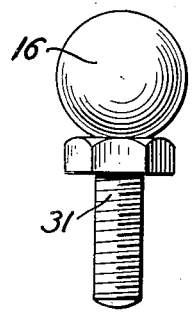
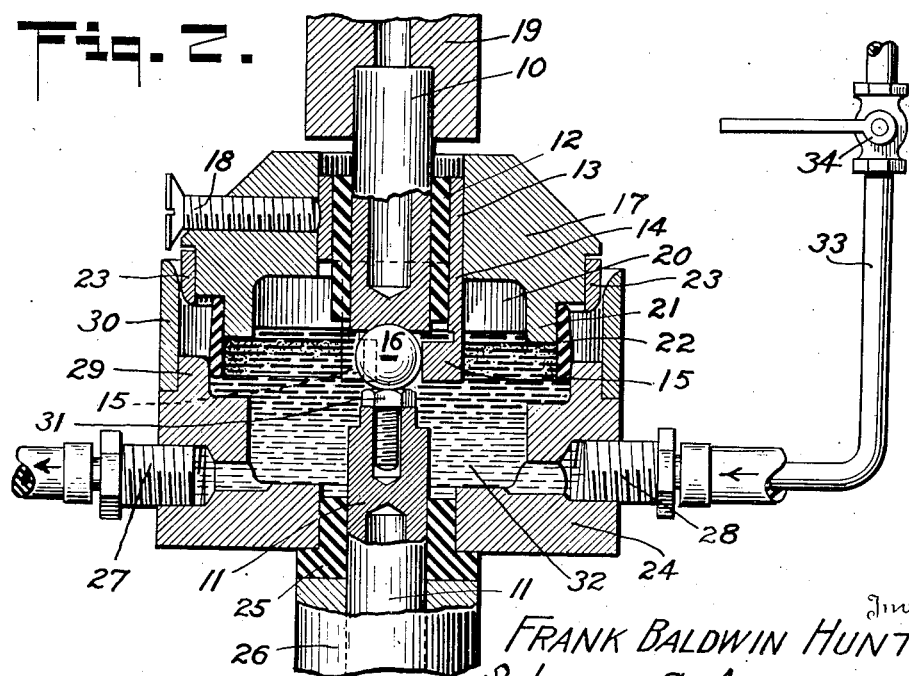
Inventor
FRANK BALDWIN HUNTER
AND JAMES C. ARNOLD
Attorney

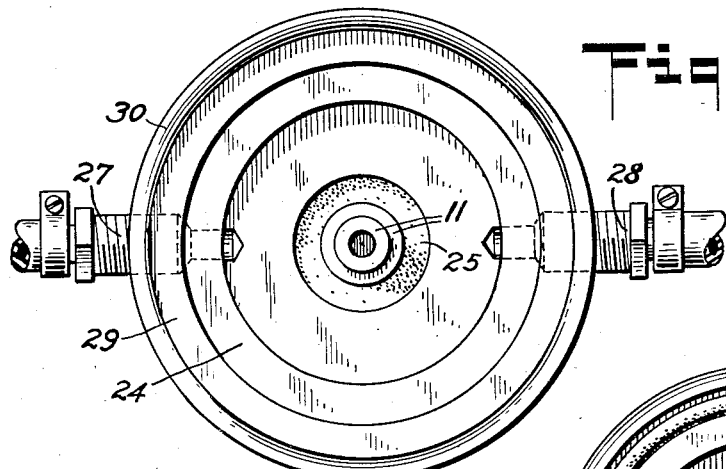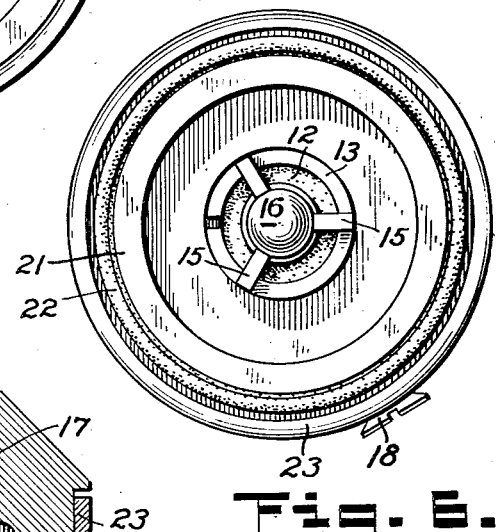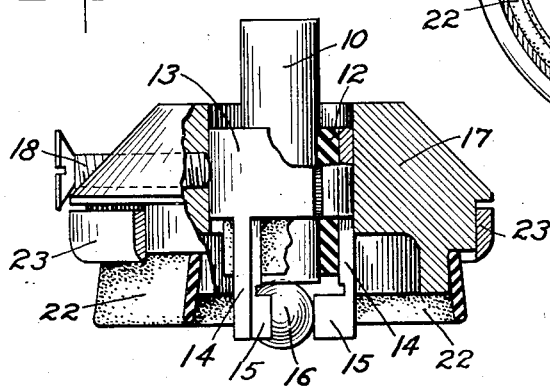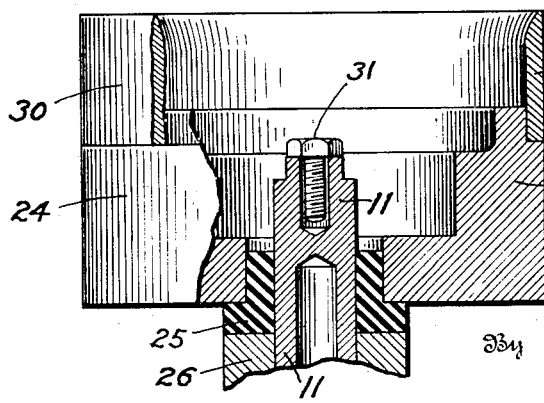
Inventor
FRANK BALDWIN HUNTER
AND JAMES C. ARNOLD
Attorney.

Patented Mar. 26, 1946

2,397,263

UNITED STATES PATENT OFFICE 2,397,263

RESISTANCE WELDING APPARATUS

Frank B. Hunter, La Canada, and James C. Arnold, Los Angeles, Calif., assignors to Adel Precision Products Corp., a corporation of California Application August 9, 1944, Serial No. 548,710

4 Claims. (Cl. 219—4)

This invention relates to an improved apparatus for resistance welding, and particularly to an apparatus designed to effectively protect the parts being welded.

One object of this invention is to provide a practical apparatus for carrying out the method of electrical welding which constitutes the subject matter of an application of these inventors, Serial No. 543,914, and now pending in the Patent Office.

The invention has to do with a method of welding two parts together, and wherein it is necessary to avoid injury to the surface of said parts, to the temper or hardness thereof, and to other vital characteristics of said parts.

We have discovered that with the application of a coolant to said parts during the welding process, said parts can be welded by resistance welding at the juncture, or contacting surfaces, of said parts while said parts are otherwise protected in the manner referred to.

Among the salient objects of the present invention are: to provide an apparatus in which the foregoing protected welding process can be carried out in a practical manner; to provide means for supplying and applying a coolant to the parts being welded, except to the immediate surfaces in engagement with each other at the juncture thereof; to provide a simple apparatus which can be used in connection with the electrodes of resistance welding apparatus now in use, or in which a change of electrodes can be quickly and conveniently accomplished; and, in general, to provide a practical, simple and efficient apparatus for accomplishing the method of resistance welding of two parts together while at the same time protecting said parts from possible injury or detrimental change because of the welding heat.

In order to more full explain our invention, we have shown one practical embodiment thereof on the accompanying two sheets of drawings, in which:

Figure 1 is a side elevation of an apparatus embodying our invention;

Figure 2 is an enlarged vertical sectional view through said embodiment;

Figure 3 is a view of two parts to be welded together at their points of contact;

Figure 4 is a plan view, looking down into the lower part of the apparatus shown in Fig. 1;

Figure 5 is a side elevation, partly in vertical section, of the upper part of said apparatus;

Figure 6 is a bottom plan view of the upper part of said apparatus; and

Figure 7 is a side elevation, partly in vertical section, of the lower part of said apparatus.

Referring in detail to the drawings, the invention as here shown for illustrative purposes comprises an upper body 17 and lower body 24, respectively, adapted to be attached to, or to have attached thereto, two electrodes 10 and 11, said upper and lower bodies being designed to be fitted together, whereby to form therebetween a chamber into which a liquid coolant can be supplied.

The upper part of said apparatus or device includes in combination, an insulating sleeve 12, fitted over the lower end of the electrode 10, and around which is a collar 13, having three legs as 14, with feet, as 15, approaching each other in a way to hold therein a steel ball 16, constituting one of the parts to be welded.

Around this collar 13 is mounted the body 17, of the upper part of said apparatus, with a set screw 18, therein for holding the parts—the collar 13, the sleeve 12, and said body 17, on the end of the electrode 10, and its holder 19, which is shown fitting down upon said body 17.

Said body member 17 is somewhat cup shape inside, providing a chamber 20, surrounded by an annular, depending flange 21, around the outside of which is an insulating ring or gasket 22. There is also provided around the outermost part of said body 17, a fitting or guide ring 23, with beveled lower outer edge, for a purpose again referred to.

The lower part 9, of said apparatus, includes a cup-like member 24, with an opening through its bottom for the other electrode 11, with an insulating bushing 25 around said electrode, within said opening, and against which the electrode holder 26 bears. From its opposite sides, said body member 24 is provided with threaded openings to receive the pipe connections, 27 and 28, in a well known arrangement for the inflow and outflow of any suitable coolant.

The upper part of said body is provided with an annular, upstanding flange 29, into which the depending flange 21, and the insulating ring or gasket 22 will fit when said parts are brought together, as will be clear from the sectional view in Fig. 2.

An outer guide and finishing collar 30 is provided around and is carried by the top of said lower part 24, with its upper, inner edge beveled to receive the lower beveled edge of the ring 23, as said parts are brought together, as shown in said Fig. 2.

The lower electrode 11, is formed in its end to receive a bolt 31, constituting the other part to be welded to the ball 16, held against the electrode 10, by the holding feet 15, 15, before referred to.

It will be understood, of course, as said parts are thus brought together, there is formed therebetween a water tight chamber 32, to which water, or other liquid coolant, is supplied through a pipe 33, with control valve 34.

The members 17 and 24 may be described as recessed bodies the recesses of which have mouth portions that can be telescoped one into the other to form the chamber for the coolant.

Thus we have illustrated and described one simple means for holding a steel ball and a bolt between two electrodes for the purpose of welding them at their contacting surfaces, while protecting their other surfaces by the supply of coolant which will take the heat emanating from the juncture of the contacting points between the ball and the bolt.

In said Fig. 2, the upper and lower parts are not fully together, but said parts are so related that they can be moved together as may be required as the upper electrode mechanism is depressed in the usual manner. The water, or other coolant, is indicated as submerging the bolt and the ball, between the holding ends of the two electrodes, and as the current is turned on and the fusing, or welding process takes place between these parts, the usual pressure is applied to said parts to perfect the weld between the contacting surfaces, while the coolant prevents injury to the other surfaces of said parts by absorbing the heat which would otherwise affect the temper, and also injure the surface of the ball and make it unfit for a valve or valve seat, as the case may be.

It will be understood, of course, that the control of the coolant supply and the electric current can be any of the well known mechanisms and need not be further illustrated, as also may be the mechanism by means of which the upper electrode is moved to and from the lower electrode.

The invention, broadly considered, is the protection of the surfaces, other than the contacting areas of the two parts, by the use of a coolant to absorb the heat and prevent injury to the parts being welded.

We do not limit our invention to the particular construction and arrangement of the parts here shown for illustration purposes, except as we may be limited by the hereto appended claims.

We claim:

1. In apparatus for resistance welding of two parts together, two electrodes, means thereon for holding said parts in contact therewith and in engagement with each other as they are to be welded, means carried by each of said parts and telescopable one into the other to form a chamber enclosing said electrodes and said parts, and means for supplying a liquid coolant to said chamber submerging said parts, whereby heat emanating from the juncture of said parts with each other is absorbed by said coolant to the protection of said parts.

2. In apparatus for electrically welding two parts while submerged in a liquid coolant, two electrodes, two cooperating recessed bodies carried by said electrodes and having mouth portions adapted to be moved into a telescopic relation to form a chamber between them around the ends of said electrodes, means in said chamber for holding the two members to be welded, in engagement with each other, between said electrodes, and means for supplying a liquid coolant to said chamber to submerge said two parts during the welding action.

3. In apparatus for electrically welding two parts while submerged in a liquid coolant, two electrodes, two cooperating recessed bodies carried by said electrodes and having mouth portions adapted to be moved into telescopic relation to form a chamber between them around the ends of said electrodes, means in said chamber for holding the two parts to be welded in engagement with each other between said electrodes; and means for supplying a liquid coolant to said chamber to submerge said two parts during the welding action, one of said bodies having around it an annular peripheral recess wherein is seated one end portion of a collar, said collar forming the mouth portion of such body.

4. In apparatus for electrically welding two parts while submerged in a liquid coolant, two electrodes, two cooperating recessed bodies carried by said electrodes and having mouth portions adapted to be moved into telescopic relation to form a chamber between them around the ends of said electrodes, means for holding the two parts to be welded in engagement with each other comprising a set of circumferentially spaced apart legs carried by one of said bodies for surrounding and holding in place one of the two parts to be welded together, and means for supplying a liquid coolant to said chamber to submerge said two parts during the welding action.

FRANK B. HUNTER.
JAMES C. ARNOLD.